Sept. 16, 1930.  H. G. WILLIAMS  1,776,139
AIRPLANE
Filed June 27, 1929   2 Sheets-Sheet 1

Inventor
H. G. Williams
By Harry Frease
Attorney

Sept. 16, 1930.   H. G. WILLIAMS   1,776,139
AIRPLANE
Filed June 27, 1929   2 Sheets-Sheet 2

Inventor
H. G. Williams
By Harry Frease
Attorney

Patented Sept. 16, 1930

1,776,139

UNITED STATES PATENT OFFICE

HOWARD G. WILLIAMS, OF CANTON, OHIO

AIRPLANE

Application filed June 27, 1929. Serial No. 374,101.

My invention relates to airplanes, and more particularly to the form, arrangement and aerodynamic characteristics of the lifting surfaces thereof, and to the relative locations of the centers of pressure of the lifting surfaces and the centers of gravity of the airplane taken as a whole, and of the greater mass elements thereof.

In the usual airplane including an engine at the front end of the fuselage, the center of gravity of the airplane as a whole is at the rear of the engine in very close vertical alinement with the center of pressure of the wings, and the mass of the engine is thus forwardly off-set from the center of gravity, and is constantly tending to nose over the airplane.

In other words, from the standpoint of mass alone, the usual airplane is dynamically unbalanced about the lateral axis, comprising one of the three usual rectangular axes through the center of gravity, that is to say, the longitudinal, the lateral, and the transverse rectangular axes.

Moreover, as usually constructed, the tail control surfaces of an airplane are rigidly mounted at the rear end of the fuselage and turn with the same during any rotary movements thereof about the longitudinal axis.

For this reason there are certain positions when banking for making a turn, in which the elevator surfaces become tail surfaces and the tail surfaces become elevator surfaces, thus increasing the difficulty of navigating the plane, and tending to confuse the inexperienced pilot.

It will be observed that birds which have relatively short bodies and are relatively heavy, such as pigeons, maintain their tails corresponding to the elevator surfaces of an airplane tail, substantially horizontal when banking their wings to make a soaring turn.

Accordingly the objects of the present improvements include the provision of an airplane in which the main elements of mass are substantially dynamically balanced with respect to the lateral rectangular axis through its center of gravity, and in which the centers of pressure of the component lifting surfaces are located with respect to the lateral rectangular axis, so as not to materially disturb the dynamic mass balance of the airplane.

Further objects of the improvements include the provision of a tail structure movable with respect to the main lifting wings, so that the tail structure may be constantly maintained for constant operation of the elevator control surfaces and the rudder control surfaces as such.

Figure 1:
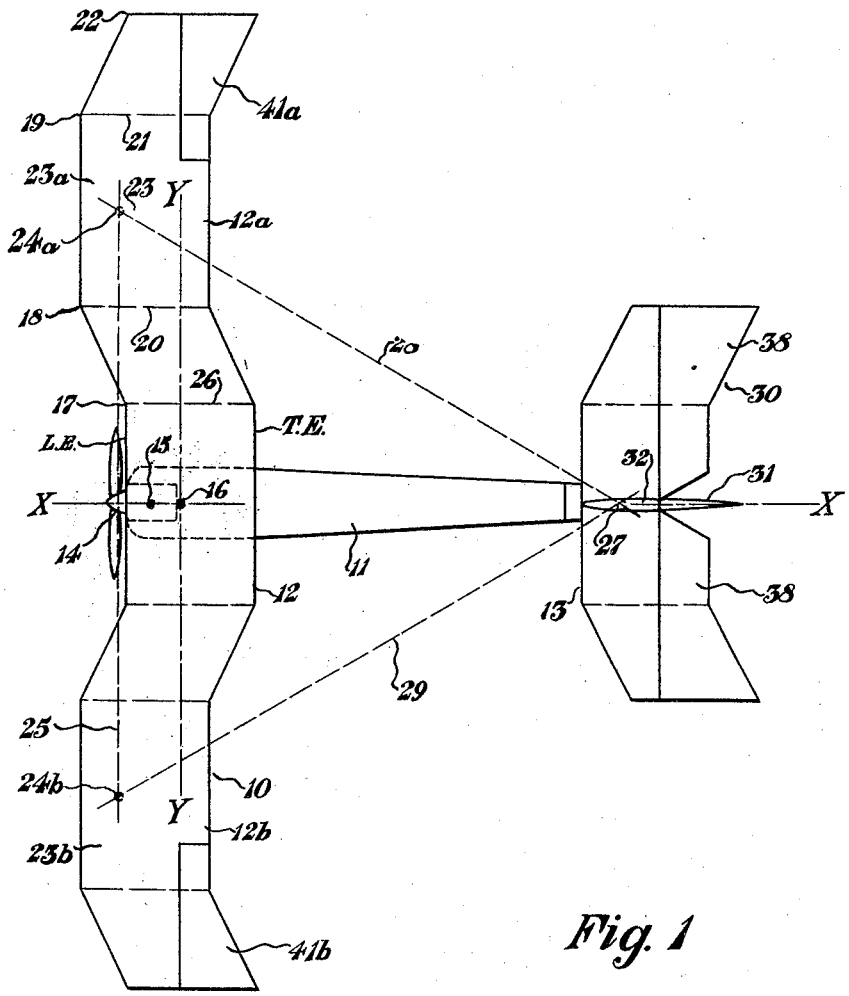
Figure 2:
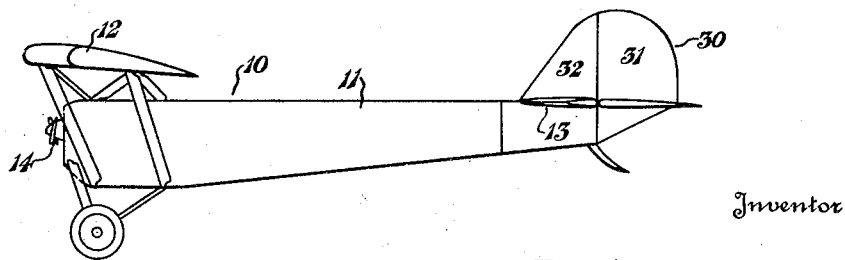
Figure 3:
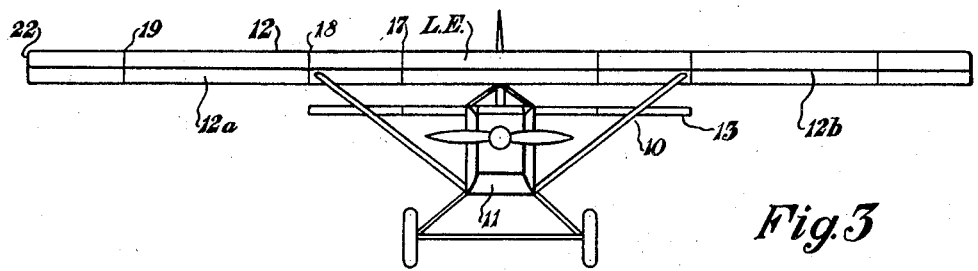
Figure 5:
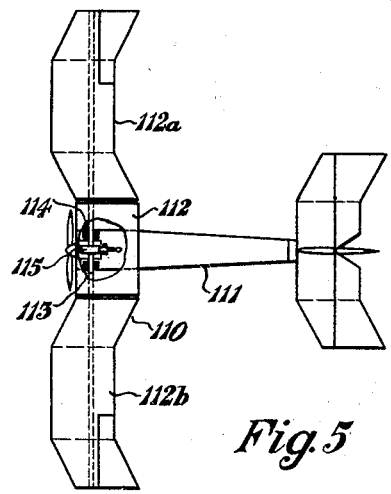
Figure 4:
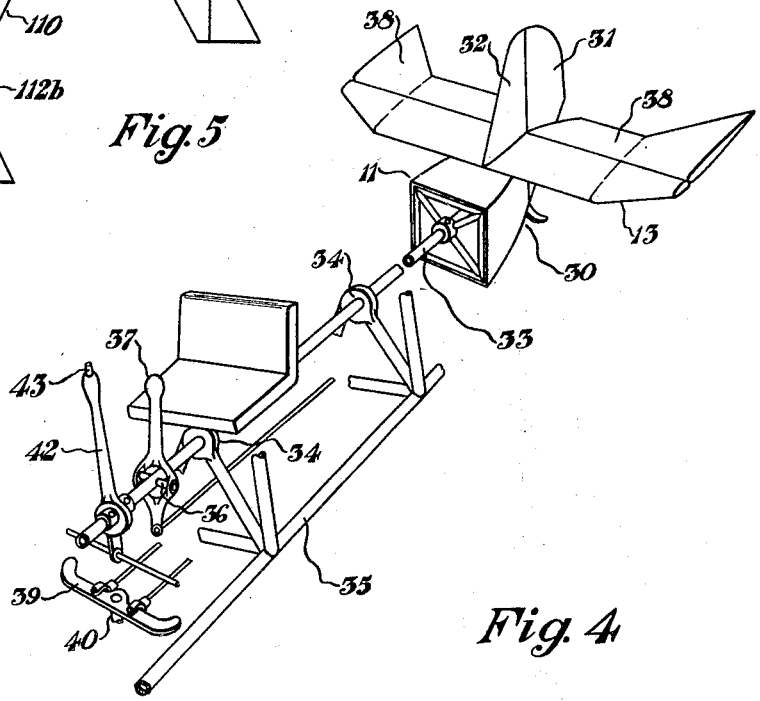

These and other objects are attained in the present invention, as will hereinafter be set forth in detail and claimed, and preferred embodiments of which are illustrated in the accompanying drawings forming part hereof, in which Figure 1 is a top plan view of an airplane comprising one embodiment of the novel improvements hereof;

Fig. 2, a side elevation thereof, with portions broken away;

Fig. 3, a front elevation thereof;

Fig. 4, a diagrammatic view illustrating the improved arrangement of the tail structure and the control means therefor; and Fig. 5, a top plan view of another embodiment of the invention.

Similar numerals refer to similar parts throughout the several views.

The improved airplane indicated generally at 10 is a monoplane, although the present invention may be applied to biplanes or multiplanes, or to gliders.

The monoplane 10 includes a fuselage 11 at the forward end of which the novel main lifting wing 12 is secured, and at the rear end of which the novel tail lifting plane 13 is secured.

At the front extremity of the fuselage, the engine and propeller 14 are mounted in the usual manner, and the center of gravity of the engine assembly may be at 15 and the center of gravity of the airplane as a whole may be at 16.

The novel wing 12 is symmetrical about the longitudinal axis X—X of the airplane, and describing one side 12ª of the wing, the leading edge L. E. thereof extends laterally outwardly from the axis X—X preferably at right angles thereto, to a point 17 which is preferably well beyond the side of the fuselage.

The leading edge then extends outwardly and forwardly to a point 18 well in front of the engine and from the point 18 extends at right angles to the axis X—X to a point 19, the span between the points 18 and 19 being such as to provide a substantial portion of the lift of the wing at that side of the axis between the chords 20 and 21 extending through these points respectively.

From the point 19 the leading edge extends rearwardly and outwardly preferably to a point 22, and the leading edge portions between the points 17 and 18, and 22 and 19 are preferably symmetrical about the mid chord 23 of the wing side $12^a$.

The trailing edge T. E. of the wing is preferably parallel with the leading edge as illustrated. The other side $12^b$ of the wing is symmetrical as aforesaid with the side $12^a$.

In the side $12^a$ of the wing, the rectangular wing span portion $23^a$ between the chords 20 and 21, the leading edge of which as aforesaid is perpendicular to the longitudinal axis X—X of the airplane, under conditions of steady horizontal flight, may have a center of pressure at $24^a$.

In the other side $12^b$ of the wing, the similar rectangular wing span portion $23^b$, symmetrical to the span portion $23^a$ may have a center of pressure at $24^b$ under the same conditions of steady horizontal flight.

The leading edges of the span portions $23^a$ and $23^b$ at opposite sides of the longitudinal axis X—X, as well as their respective centers of pressure $24^a$ and $24^b$, under the conditions of steady horizontal flight, are as illustrated preferably located forwardly of the center of gravity 15 of the engine assembly as well as forwardly of the center of gravity 16 of the airplane as a whole.

The lateral rectangular axis Y—Y of the plane extending through the center of gravity 16, is thus parallel with a line 25 drawn through the centers of pressure $24^a$ and $24^b$ of the rectangular wing span portions $23^a$ and $23^b$.

The tail lifting plane 13 is preferably geometrically similar, and preferably congruent with, that portion of either side of the wing, as for example, the side $12^a$, beyond the chord 26 through the point 17, where the leading edge commences to extend forwardly.

The mid chord of the tail plane 13 is preferably located in the rectangular plane through the longitudinal axis X—X and the tail plane 13 is thus symmetrical about the axis X—X.

In addition to the surface required for attaining longitudinal stability by the usual aerodynamic relationship between the angle of attack of the tail plane and the angle of attack of the main plane 12, the tail plane may be preferably of sufficient area, so that by suitable regulation of the elevators at the will of the pilot, a lift may be obtained from the tail plane, the center of pressure of which may be at 27.

A line 28 drawn through the center of pressure $24^a$ of the rectangular wing span portion $23^a$ and the center of pressure 27 of the tail plane, a line 29 drawn through the center of pressure 27 of the tail plane and the center of pressure $24^b$ of the rectangular wing span portion $23^b$, and the line 25 drawn through the centers of pressure $24^a$ and $24^b$, thus, at the will of the pilot, determine a triangle within which are located not only the center of gravity 16 of the airplane as a whole, but also the center of gravity 15 of the engine.

This relationship may also come into play automatically, if for example, the engine goes dead, and the relationship is a result of the location of the leading edges of the rectangular wing span portions $23^a$ and $23^b$ forwardly of the centers of gravity of the airplane and engine as aforesaid, whereby lifting surfaces are provided forwardly of these centers of gravity, which oppose the normal tendency of the engine to nose the plane over, when the engines goes dead, and the propeller ceases to rotate.

Accordingly under the control of the pilot, or automatically when the engine dies, the plane assumes the normal position for steady horizontal flight, or gliding.

The tail plane 13 is part of a tail structure indicated generally at 30, which includes a rudder 31 and a fin 32, and the tail structure 30 is preferably movably mounted with respect to the fuselage, for rotation about an axis parallel with the longitudinal axis X—X of the airplane, as by being secured on the outer end of a longitudinally extending shaft 33, which is rotatably mounted in bearings 34, which are included as parts of the fuselage frame 35, as illustrated in the diagrammatical view comprising Fig. 4.

The shaft 33 may have a normally horizontal stub shaft 36 secured thereon and extending from opposite sides thereof upon the outer ends of which a tail and elevator control lever 37 is secured.

Accordingly rotation of the lever 37 about the axis of the shaft 33, causes the same to turn and rotate the entire tail structure 30 with it; while movement of the lever 37 in the direction of the axis of the shaft 36 causes operation of the elevators 38 of the tail structure in the usual manner.

The rudder 31 may be operated in the usual manner by means of a rudder control bar 39 secured within the fuselage for rotation about a normally vertical pivot 40.

The operation of the wing flaps or ailerons $41^a$ and $41^b$ is effected independently of the operation of the tail structure surfaces, as by means of a lever 42 mounted for rotation on the shaft 33.

The use of the two levers 37 and 42 thus requires both of the pilot's hands, and a throttle control button 43 may be operatively mounted on one of the levers and connected by wires not shown with the engine throttle.

Accordingly by this arrangement of the tail structure 30, the tail plane 13 may be maintained horizontal at all times.

The modified embodiment of the improved airplane indicated generally at 110 in Fig. 5 is similar in external form to the airplane 10.

The airplane 110 is illustrated as a monoplane and includes a fuselage 111 at the forward end of which are secured main lifting surfaces including a center section 112 and side wings 112$^a$ and 112$^b$.

The center section 112 is immovably secured to the fuselage, but the side wings 112$^a$ and 112$^b$ are mounted for selective rotation about a lateral axis, and are preferably secured on the outer ends of a laterally extending shaft 113 which is mounted in suitable bearings 114 secured to the fuselage, and the shaft 113 is normally prevented from rotation as by means of a friction brake indicated generally at 115.

The remaining parts of the airplane are preferably similar to those described for the airplane 10.

If for any reason the airplane 110 gets out of the control of the pilot, the brake 115 is released permitting rotation of the shaft 113 and the side planes will then rotate with the shaft due to the downward movement of the plane through the atmosphere towards the earth.

This rotation of the side wings provides a lift which causes the plane to slowly glide towards the earth without any further attention of the pilot, and thus the direct fall of the airplane is broken.

I claim:

An airplane including a lifting plane symmetrical with respect to the longitudinal axis of the airplane, and the leading edge of the lifting plane at each side of the longitudinal axis extending first angularly forward with respect to the longitudinal axis, and then extending substantially at right angles to the axis, and an engine, the center of gravity of the engine being located at the rear of the leading edge of the lifting plane.

In testimony that I claim the above, I have hereunto subscribed my name.

HOWARD G. WILLIAMS.